US006971103B2

(12) United States Patent
Hokenek et al.

(10) Patent No.: US 6,971,103 B2
(45) Date of Patent: Nov. 29, 2005

(54) INTER-THREAD COMMUNICATIONS USING SHARED INTERRUPT REGISTER

(75) Inventors: Erdem Hokenek, Yorktown Heights, NY (US); Mayan Moudgill, White Plains, NY (US); Sean M. Dorward, Martinsville, NJ (US)

(73) Assignee: Sandbridge Technologies, Inc., White Plains, NY (US)

( * ) Notice: Subject to any disclaimer, the term of this patent is extended or adjusted under 35 U.S.C. 154(b) by 92 days.

(21) Appl. No.: 10/404,175

(22) Filed: Apr. 1, 2003

(65) Prior Publication Data

US 2004/0073910 A1 Apr. 15, 2004

Related U.S. Application Data

(60) Provisional application No. 60/418,455, filed on Oct. 15, 2002.

(51) Int. Cl.[7] .................................................. G06F 9/46
(52) U.S. Cl. ...................... 718/107; 718/100; 718/102; 718/103; 718/108; 712/228
(58) Field of Search ................................ 718/100, 102, 718/103, 107, 108, 104; 712/228; 719/310, 318; 710/260

(56) References Cited

U.S. PATENT DOCUMENTS 4,980,824 A * 12/1990 Tulpule et al. .............. 718/106
5,524,250 A *  6/1996 Chesson et al. ............ 712/228

(Continued)

OTHER PUBLICATIONS

"Hyper–Threading Technology on the Intel® Xeon™ Processor Family for Servers," White Paper, Intel Corporation, 12 pages, 2002.

D.T. Marr et al., "Hyper–Threading Technology Architecture and Microarchitecture," Intel Technology Journal Q1, pp. 1–12, 2002.
J. Borozan, "Microsoft Windows–Based Servers and Intel Hyper–Threading Technology," Microsoft Corporation, 15 pages, Apr. 2002.
C. J. Glossner, "The Delft–Java Engine," Doctoral Thesis, Delft University of Technology, Netherlands, Nov. 5, 2001.
"Basic Features of the HEP Supercomputer," http://www-ee.eng.hawaii.edu/ ~nava/HEP/introduction.html, pp. 1–2.
"The MOVE Concept," http://ce.et.tudelft.nl/MOVE/section3.2html, pp. 1–2.
"Stimulataneous Multithreading Project," http://www.cs.washington.edu/research/smt/ index.html, pp. 1–7.
"Introduction to Multithreading, Superthreading and Hyperthreading," http://arstechnica.com/paedia/h/hyperthreading/hyperthreading–1.html, pp. 1–5.

*Primary Examiner*—Meng-Al T. An
*Assistant Examiner*—Lilian Vo
(74) *Attorney, Agent, or Firm*—Ryan, Mason & Lewis, LLP

(57) ABSTRACT

A multithreaded processor includes an interrupt controller for processing a cross-thread interrupt directed from a requesting thread to a destination thread. The interrupt controller in an illustrative embodiment receives a request for delivery of the cross-thread interrupt to the destination thread, determines whether the destination thread of the cross-thread interrupt is enabled for receipt of cross-thread interrupts, and utilizes a thread identifier to control delivery of the cross-thread interrupt to the destination thread if the destination thread is enabled for receipt of cross-thread interrupts. The requesting thread requests delivery of the cross-thread interrupt to the destination thread by setting a corresponding interrupt pending bit in a flag register of the multithreaded processor. The destination thread is enabled for receipt of cross-thread interrupts if a corresponding enable bit is set in an enable register of the multithreaded processor. The flag and enable registers may be implemented within the interrupt controller.

20 Claims, 4 Drawing Sheets

U.S. PATENT DOCUMENTS

| | | | | |
|---|---|---|---|---|
| 5,694,604 | A | * | 12/1997 | Reiffin ........................ 718/107 |
| 6,061,710 | A | * | 5/2000 | Eickemeyer et al. ........ 718/107 |
| 6,243,735 | B1 | * | 6/2001 | Imanishi et al. ............. 718/102 |
| 6,430,593 | B1 | * | 8/2002 | Lindsley ..................... 718/103 |
| 6,567,839 | B1 | * | 5/2003 | Borkenhagen et al. ...... 718/103 |
| 6,687,818 | B1 | * | 2/2004 | Svenkeson et al. ............ 713/2 |
| 6,697,935 | B1 | * | 2/2004 | Borkenhagen et al. ...... 712/228 |
| 2001/0052053 | A1 | * | 12/2001 | Nemirovsky et al. ....... 711/138 |
| 2002/0103847 | A1 | * | 8/2002 | Potash ........................ 709/107 |
| 2002/0144004 | A1 | * | 10/2002 | Gaur et al. .................. 709/310 |
| 2003/0061258 | A1 | * | 3/2003 | Rodgers et al. ............. 709/102 |
| 2003/0154234 | A1 | * | 8/2003 | Larson ....................... 709/107 |
| 2004/0071152 | A1 | * | 4/2004 | Wolrich et al. ............. 370/420 |

\* cited by examiner

FIG. 3

THREAD INTERRUPT ENABLE REGISTER (TIER)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| DADR | | | | | | | | IADR | | | | | | | | TIMER | | | | | | | | MASTER | | | | | | | |

FIG. 4

THREAD INTERRUPT FLAG REGISTER (TIFR)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| DADR | | | | | | | | IADR | | | | | | | | TIMER | | | | | | | | XTHR | | | | | | | |

INTER-THREAD COMMUNICATIONS USING SHARED INTERRUPT REGISTER

RELATED APPLICATION(S)

The present application claims the priority of U.S. Provisional Application Ser. No. 60/418,455, filed Oct. 15, 2002 in the name of E. Hokenek et al. and entitled "High Speed Cross-Thread Interrupts," which is incorporated by reference herein.

FIELD OF THE INVENTION

The present invention relates generally to the field of digital data processors, and more particularly to interrupt techniques for use in a multithreaded processor.

BACKGROUND OF THE INVENTION

Computer systems have historically used an "interrupt" mechanism to inform the processor of unexpected or rare activities or conditions. For example, invalid computation, arrival of network packets, and completion of a disk access all cause interrupts on a typical modern computer. Special hardware, not involved in the normal operation of the processor, detects the condition and signals the processor. Upon receiving an interrupt, the processor suspends its current task, performs the steps necessary to handle the condition, and then resumes its normal execution. This interrupt facility allows the computer to respond quickly to rare events without having to continually check, or "poll," for them.

Multi-processor systems typically support an inter-processor interrupt, which allows one processor to interrupt another. Inter-processor interrupts are used to synchronize the activities of the different processors and to notify processors of changing conditions in the system or in the programs they are running. For example, when the status of a program, which is running on multiple processors, changes, this change must be reflected not only on the processor which detected the change, but on all processors involved in executing the program. Additionally, inter-processor interrupts may be used to notify a processor that an inter-processor message has arrived.

Delivery and reception of an inter-processor interrupt is relatively fast, but still takes many processor clock cycles. Interrupt controllers used to send and receive the interrupts are frequently separate from the processors, and require multi-cycle operations to manipulate. Also, actually sending the interrupt from one interrupt controller to another may require several processor clock cycles, for example, because processors typically execute at a faster clock rate than conventional interrupt controllers.

A multithreaded processor is a processor which supports simultaneous execution of multiple distinct instruction sequences or "threads." The processing threads cooperate to use more of the computational power in the processor than a single thread alone. This cooperation typically leads to more synchronization and communication than is typical for a multi-processor system, thereby placing a higher premium on the cost of communication mechanisms such as cross-thread interrupts, that is, interrupts from one thread to another.

Existing multithreaded processors, such as Intel® processors utilizing "hyper-threading technology," typically process cross-thread interrupts using techniques which emulate those used to process the previously described inter-processor interrupts in multi-processor systems. As a result, conventional techniques for processing cross-thread interrupts are unduly slow, and can require significant overhead in terms of processing resources. For example, a significant number of instruction execution cycles is typically required for one thread to interrupt another using conventional techniques.

As is apparent from the foregoing, a need exists for improved cross-thread interrupt processing techniques for use in a multithreaded processor.

SUMMARY OF THE INVENTION

The present invention provides improved techniques for processing cross-thread interrupts in a multithreaded processor.

In accordance with one aspect of the invention, a multithreaded processor includes an interrupt controller for processing a cross-thread interrupt directed from a requesting thread to a destination thread.

The interrupt controller in an illustrative embodiment receives a request for delivery of the cross-thread interrupt to the destination thread, determines whether the destination thread of the cross-thread interrupt is enabled for receipt of cross-thread interrupts, and utilizes a thread identifier to control delivery of the cross-thread interrupt to the destination thread if the destination thread is enabled for receipt of cross-thread interrupts.

The requesting thread requests delivery of the cross-thread interrupt to the destination thread by setting a corresponding interrupt pending bit in a flag register of the multithreaded processor. The interrupt pending bit may be automatically cleared when the cross-thread interrupt is delivered to the destination thread.

The destination thread is enabled for receipt of cross-thread interrupts if a corresponding enable bit is set in an enable register of the multithreaded processor. The enable bit may be automatically cleared when the cross-thread interrupt is delivered to the destination thread, in order to prevent simultaneous reception of multiple interrupts by the destination thread, and then subsequently reset after servicing of the cross-thread interrupt in order to re-enable receipt of other interrupts by the destination thread.

The enable register and the flag register in the illustrative embodiment each comprise at least N portions, with each of the N portions corresponding to one of N threads of the multithreaded processor. Preferably, each of the N threads is permitted to access only its corresponding portion of the enable register and none of the N-1 portions of the enable register corresponding to other threads. However, each of the N threads is permitted to access each of the N portions of the flag register.

In accordance with another aspect of the invention, logic circuitry in the interrupt controller may include interrupt request logic for processing the interrupt request, a plurality of logic gates, each receiving as inputs a corresponding bit from each of the enable register and the flag register, and multiplexing circuitry. The multiplexing circuitry selects from among outputs of the logic gates at least one output for use in controlling generation of the cross-thread interrupt, based at least in part on the thread identifier.

The logic circuitry of the interrupt controller may further include priority logic for prioritizing the cross-thread interrupt relative to other types of interrupts, such as timer interrupts, instruction address interrupts, externally-generated interrupts, etc.

Advantageously, the invention provides a low-latency, low-overhead mechanism for delivering and servicing cross-thread interrupts in a multithreaded processor. For example, in the above-noted illustrative embodiment, a given thread can interrupt another thread within a single instruction execution cycle.

BRIEF DESCRIPTION OF THE DRAWINGS

FIG. 3 shows an example thread interrupt enable register (TIER) that may be implemented in the interrupt controller of the multithreaded processor of FIG. 2 in accordance with the techniques of the invention.

FIG. 4 shows an example thread interrupt flag register (TIFR) that may be implemented in the interrupt controller of the multithreaded processor of FIG. 2 in accordance with the techniques of the invention.

DETAILED DESCRIPTION OF THE INVENTION

The present invention will be illustrated herein as implemented in a multithreaded processor having associated therewith a main memory, a multithreaded cache memory, and a multithreaded data memory. It should be understood, however, that the invention does not require the use of the particular multithreaded processor and memory configurations of the illustrative embodiment, and is more generally suitable for use in any multithreaded processor interrupt processing application in which it is desirable to provide improved processing of cross-thread interrupts.

An example processing system 100 which implements a cross-thread interrupt processing technique in accordance with the invention will be described in conjunction with FIGS. 1 and 2.

Figure 1:
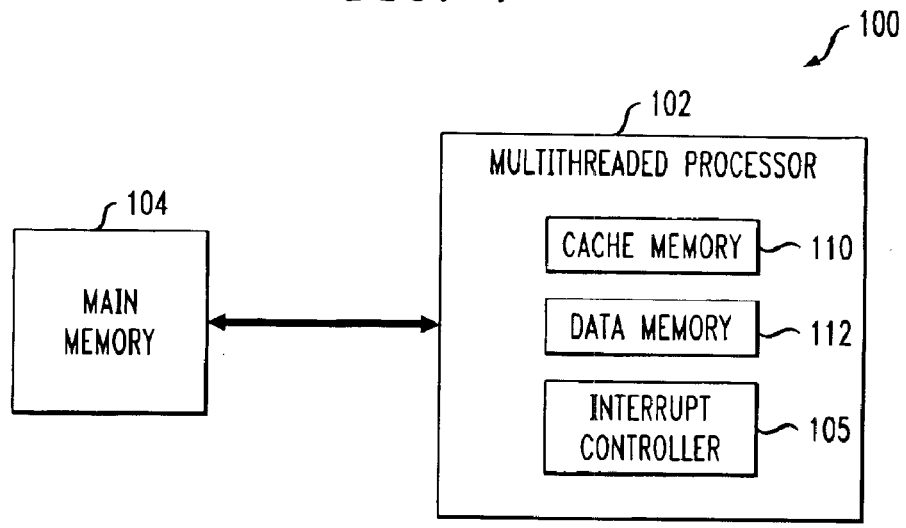
FIG. 1 is a block diagram of an example processing system in which the invention is implemented.

FIG. 1 shows the processing system 100 as including a multithreaded processor 102 coupled to a main memory 104. The multithreaded processor 102 includes an interrupt controller 105, a multithreaded cache memory 110 and a multithreaded data memory 112.

The present invention in accordance with one aspect thereof provides improved techniques for processing cross-thread interrupts in multithreaded processor 102. In an illustrative embodiment, these techniques are implemented primarily within the interrupt controller 105. The interrupt controller 105 in this embodiment is preferably integrated within the multithreaded processor 102, as is illustrated generally in FIG. 1.

It is to be appreciated that the interrupt controller 105, although configured in accordance with the techniques of the invention for efficient processing of cross-thread interrupts, can also be configured to process other types of interrupts, such as data or instruction address interrupts, timer interrupts, externally-generated interrupts, and so on, using conventional techniques well-known to those skilled in the art. Examples of externally-generated interrupts may include interrupts associated with particular devices external to the multithreaded processor 102, or associated with particular input pins of the processor.

Interrupt controller 105 may therefore include various conventional elements, in addition to or in place of any particular interrupt controller elements described herein.

Figure 2:
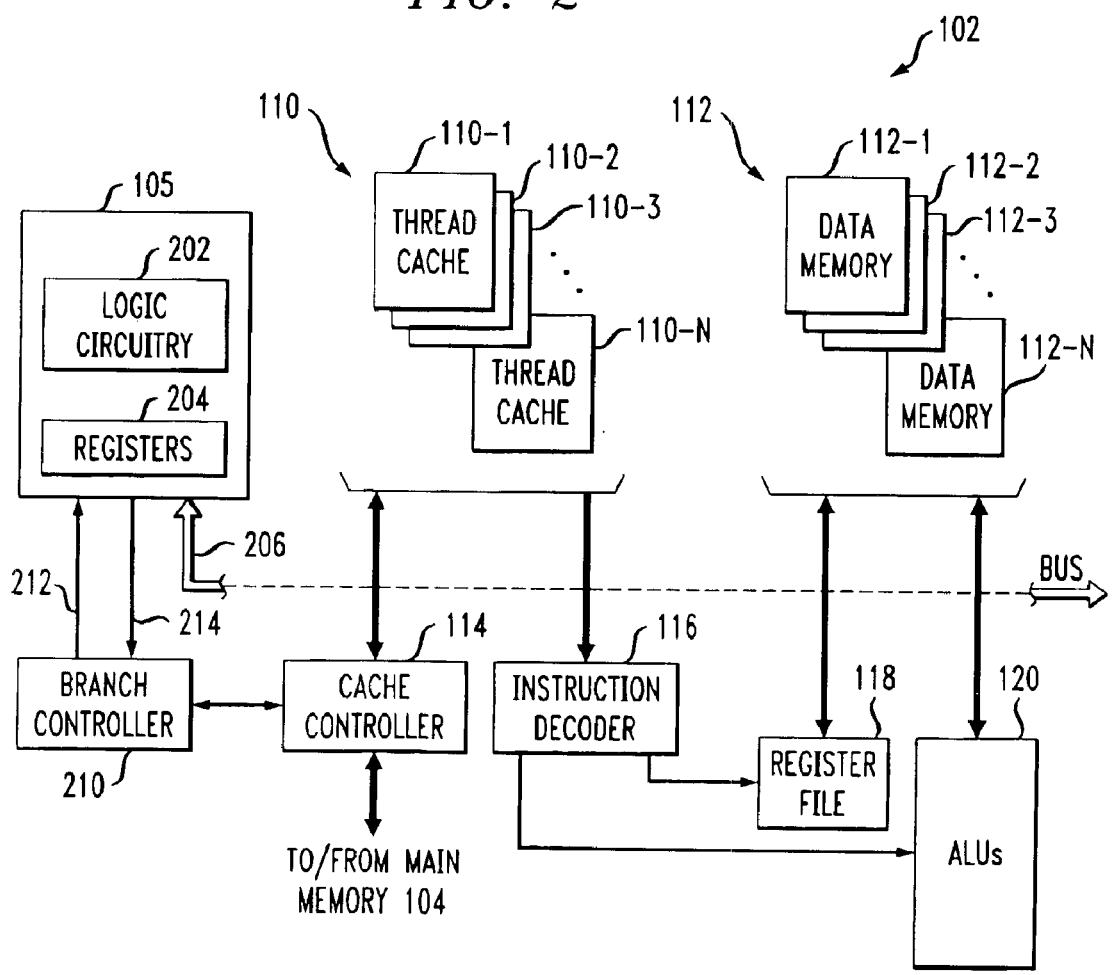
FIG. 2 is a more detailed block diagram of an illustrative embodiment of a multithreaded processor of the FIG. 1 processing system.

FIG. 2 shows a more detailed view of one possible implementation of the multithreaded processor 102. In this embodiment, the multithreaded processor 102 includes the interrupt controller 105, the multithreaded cache memory 110, the data memory 112, a cache controller 114, an instruction decoder 116, a register file 118, and a set of arithmetic logic units (ALUs) 120. The multithreaded cache memory 110 is also referred to herein as a multithreaded cache.

It should be noted that the particular arrangements shown in FIGS. 1 and 2 are simplified for clarity of illustration, and additional or alternative elements not explicitly shown may be included, as will be apparent to those skilled in the art.

The interrupt controller 105 includes logic circuitry 202 and interrupt controller registers 204. The registers 204 in the illustrative embodiment include enable and flag registers to be described in greater detail below in conjunction with FIGS. 3 and 4, respectively. The logic circuitry 202 and its interaction with the registers 204 will be described in greater detail below in conjunction with FIG. 5.

The interrupt controller 105 may be coupled via system bus 206 to other elements of the multithreaded processor 102.

Also associated with the interrupt controller 105 in this illustrative embodiment is a branch controller 210. The branch controller 210 is coupled to the cache controller 114 and to the interrupt controller 105, and may also communicate with one or more other elements of the multithreaded processor 102 via bus 206 or other suitable connections not explicitly shown in the figure. Although shown as a separate element in the figure, the functionality of the branch controller 210 as described herein may be implemented in whole or in part within the interrupt controller 105 or other element of the multithreaded processor 102. The branch controller 210 or the associated interrupt controller 105 may also implement other functionality, such as functionality associated with a conventional thread execution controller.

The multithreaded cache 110 includes a plurality of thread caches 110-1, 110-2, . . . 110-N, where N generally denotes the number of threads supported by the multithreaded processor 102. Each thread thus has a corresponding thread cache associated therewith in the multithreaded cache 110. Similarly, the data memory 112 includes N distinct data memory instances, denoted data memories 112-1, 112-2, . . . 112-N as shown.

Each of the thread caches in the multithreaded cache 110 may comprise a memory array having one or more sets of memory locations. A given thread cache may further comprise or otherwise have associated therewith a thread identifier register for storing an associated thread identifier.

The multithreaded cache 110 interfaces with the main memory 104 via the cache controller 114. The cache controller 114 ensures that the appropriate instructions from main memory 104 are loaded into the multithreaded cache 110. The cache controller 114 in this illustrative embodiment, operating in conjunction with logic circuitry or other processing elements associated with the individual thread caches 110-1, 110-2, . . . 110-N, implements at least a portion of an address mapping technique, such as fully associative mapping, direct mapping or set-associative mapping. Illustrative set-associative mapping techniques suitable for use in conjunction with the present invention are described in U.S. patent application Ser. Nos. 10/161,774 and 10/161,874, both filed Jun. 4, 2002 and commonly assigned with the present application, and both of which are incorporated by reference herein.

In general, the multithreaded cache 110 is used to store instructions to be executed by the multithreaded processor 102, while the data memory 112 stores data that is operated on by the instructions. Instructions are fetched from the multithreaded cache 110 by the instruction decoder 116 which operates in conjunction with the register file 118 and the ALUs 120 in controlling the execution of the instructions in a conventional manner. The operation of multithreaded processor elements such as 116, 118 and 120 is well-understood in the art, and therefore not described in further detail herein.

The data memory 112 is typically directly connected to the main memory 104, although this connection is not explicitly shown in the figure.

One or more of the memories 104, 110 and 112 may each be configured so as to include multiple banks or other designated portions. By way of example, each bank may be viewed as being made up of one or more memory modules, or a specified portion of a single memory module.

Techniques for thread-based banking of these and other memories associated with a multithreaded processor are described in U.S. patent application Ser. No. 10/269,247, filed Oct. 11, 2002 and entitled "Method and Apparatus for Thread-Based Memory Access in a Multithreaded Processor," which is commonly assigned herewith and incorporated by reference herein.

The term "memory" as used herein is intended to be construed broadly so as to encompass an internal or external memory, a cache memory, a data memory, or other arrangement of data storage elements. The invention is not limited to any particular memory type, configuration or application. It should be noted, however, that memories are generally understood in the processor art as being distinct from registers such as those comprising register file 118 in FIG. 2.

Techniques for thread-based access to register files are described in U.S. patent application Ser. No. 10/269,373, filed Oct. 11, 2002 and entitled "Method and Apparatus for Register File Port Reduction in a Multithreaded Processor," which is commonly assigned herewith and incorporated by reference herein.

It should also be emphasized that the present invention does not require the particular multithreaded processor configuration shown in FIG. 2. The invention can be implemented in a wide variety of other multithreaded processor configurations.

A more particular example of multithreaded processor of the type shown in FIG. 2 and suitable for use in conjunction with the present invention is described in U.S. patent application Ser. No. 10/269,372, filed Oct. 11, 2002 and entitled "Multithreaded Processor With Efficient Processing For Convergence Device Applications," which is commonly assigned herewith and incorporated by reference herein. An illustrative embodiment of a multithreaded processor as described in U.S. patent application Ser. No. 10/269,372 is capable of executing RISC-based control code, digital signal processor (DSP) code, Java code and network processing code. The processor includes a single instruction multiple data (SIMD) vector unit, a reduction unit, and long instruction word (LIW) compounded instruction execution.

The multithreaded processor 102 may be configured to utilize a threading approach referred to as token triggered threading, or other suitable threading techniques. Pipelining is also preferably used in conjunction with such threading. Examples of threading and pipelining techniques suitable for use with the present invention are described in U.S. patent application Ser. No. 10/269,245, filed Oct. 11, 2002 and entitled "Method and Apparatus for Token Triggered Multithreading," which is commonly assigned herewith and incorporated by reference herein.

In a multithreaded processor, a given thread can generally be viewed in terms of hardware as well as software. The particular processor hardware associated with a given thread is often more particularly referred to as a hardware thread unit or simply a "context." The term "thread" as used herein is intended to include either software or hardware threads, or both.

The interaction of the branch controller 210 with the interrupt controller 105 and other elements of the multithreaded processor 102 will now be described in greater detail. Generally, the branch controller 210 maintains information specifying what instruction each thread is executing, and directs the thread caches as to which instructions should be sent to the instruction decoder 116 for decoding and subsequent execution. The branch controller 210 will therefore typically maintain, for each of the threads, a separate program counter, as well as a mechanism to update the program counter after each ordinary instruction, branch instruction, interrupt, etc.

Figure 5:
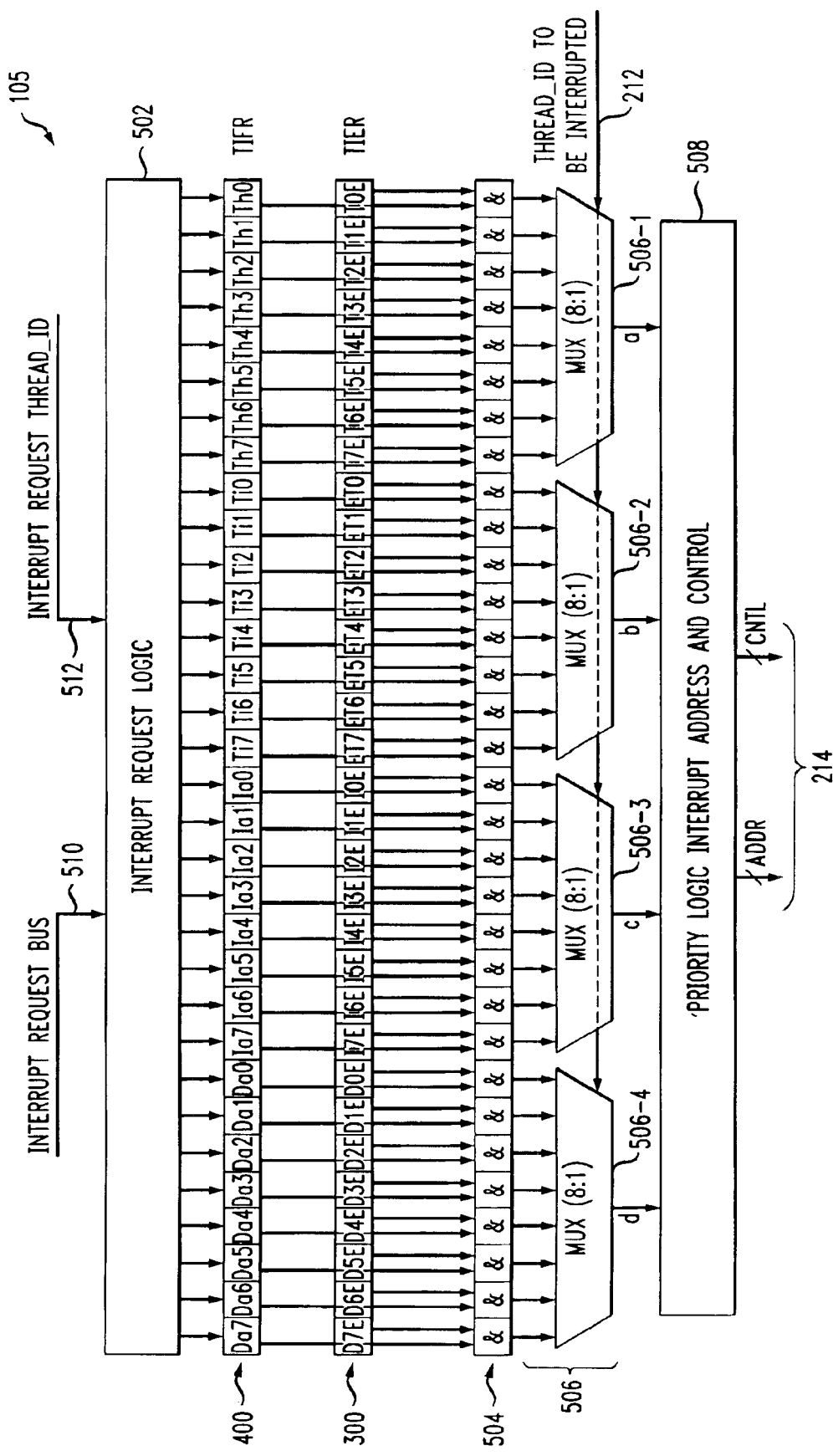
FIG. 5 shows an illustrative embodiment of an interrupt controller configured in accordance with the invention.

In the FIG. 2 diagram, there are two connections 212 and 214 shown between the branch controller 210 and the interrupt controller 105. More detailed examples of these connections are shown in FIG. 5, as will be described below. The branch controller 210 utilizes the connection 212 to query the interrupt controller 105 as to whether there is an interrupt for the thread that will be next to execute, also referred to herein as the "next to execute" thread. The interrupt controller 105 returns a response to this query to the branch controller 210 over the connection 214. In the FIG. 5 examples, the connection 212 is more particularly specified as identifying the particular thread to be interrupted, while the connection 214 includes address and control outputs associated with a particular interrupt if any.

As noted above, the present invention in accordance with one aspect thereof provides improved cross-thread interrupt processing techniques for use by the multithreaded processor 102.

In an illustrative embodiment of the invention, a multithreaded processor such as multithreaded processor 102 is configured so as to allow one thread to interrupt another within a single instruction execution cycle. As will be described below, by integrating the interrupt controller 105 into the multithreaded processor 102, and making the interrupt controller registers 204 quickly accessible from the processing threads, the time needed deliver, service, or otherwise process cross-thread interrupts is dramatically reduced.

FIGS. 3 and 4 illustrate exemplary enable and flag registers, respectively, associated with interrupt controller 105 in accordance with the invention. The registers of FIGS. 3 and 4 may be viewed as particular examples of the registers 204 shown generally in FIG. 2. As will be described in greater detail below, these illustrative interrupt controller registers control which interrupts are deliverable to which thread at any given time, and can be read or modified in a single instruction execution cycle. As noted above, these registers are preferably integrated with the multithreaded processor 102. For example, these interrupt controller registers may be so-called "special purpose" registers that are integrated within the interrupt controller 105 or elsewhere within the multithreaded processor. However, other types of registers may also be used in implementing the techniques of the invention.

In the embodiments described in conjunction with FIGS. 3 through 5, it will be assumed for clarity and simplicity of illustration that the number of threads N is eight. Of course, the invention does not require this particular number of threads. The disclosed arrangements can be modified in a straightforward manner to accommodate other numbers of threads, as will be readily apparent to those skilled in the art.

Referring initially to FIG. 3, a thread interrupt enable register (TIER) 300 is shown. The TIER may be viewed as eight distinct four-bit registers, one for each thread, although in this embodiment the TIER is implemented using a single 32-bit register with bits 0, 8, 16 and 24 being associated with Thread 1, bits 1, 9, 17 and 25 being associated with Thread 2, and so on.

The interrupt controller is configured to ensure that each thread can access only its corresponding portion of the TIER. The TIER includes, for each of the eight threads, a data address (DADR) interrupt enable bit, an instruction address (IADR) interrupt enable bit, a timer interrupt enable bit, and a master interrupt enable bit. For a given one of the threads, the master interrupt enable bit when set allows that thread to receive interrupts from all interrupt sources, and when cleared prevents that thread from receiving interrupts from all interrupt sources. It is assumed for clarity of illustration that the terms "set" and "cleared" as used herein refer to respective logic zero and logic one levels, although other assumptions can be used.

It should be noted that the TIER does not require specific bits for enabling cross-thread interrupts, since these interrupts in the illustrative embodiment may be generated at least in part by software running on the multithreaded processor 102.

Generally, the TIER allows a given thread to enable the receipt of interrupts by that thread from a variety of sources. In this embodiment, by setting the master enable bit in its corresponding portion of the TIER, a given thread can ensure the receipt of interrupts from all sources, including cross-thread interrupts from other threads. It should be noted that other arrangements can be used to enable cross-thread interrupts in accordance with the invention.

FIG. 4 shows a thread interrupt flag register (TIFR) 400 which is shared between the eight threads in this embodiment. The TIFR is "shared" between the threads in that each thread can access the entire register. This is in contrast to the TIER, which includes distinct portions accessible only to the corresponding threads.

The TIFR includes a set of flag bits, also referred to herein as "interrupt pending" bits, for each of the eight threads. More specifically, the TIFR includes a total of four interrupt pending bits for a given thread, namely, a separate interrupt pending bit for each of a data address (DADR) interrupt, an instruction address (IADR) interrupt, a timer interrupt and a cross-thread (XTHR) interrupt. The TIFR in this embodiment is also implemented using a single 32-bit register, with bits 0, 8, 16 and 24 being associated with Thread 1, bits 1, 9, 17 and 25 being associated with Thread 2, and so on. In the TIFR, a given interrupt pending bit, when set, indicates that the corresponding interrupt is pending, and when cleared, indicates that the corresponding interrupt is not pending. Generally, a given thread sets a cross-thread interrupt for another thread by setting the corresponding XTHR interrupt pending bit in the TIFR.

As indicated above, the TIER and TIFR registers of the present invention do not require the particular configurations shown in the drawings. For example, although illustrated as single registers in FIGS. 3 and 4, one or both of the TIER and TIFR may alternatively each be implemented as multiple registers, such as one register per thread, one register per pair of threads, and so on. Numerous other alternative configurations of the TIER and TIFR will be readily apparent to those skilled in the art.

FIG. 5 shows a more detailed view of the interrupt controller 105 in an illustrative embodiment of the invention. The interrupt controller 105 includes the TIER 300 and the TIFR 400, each implemented as a 32-bit register in the manner previously described. The interrupt controller 105 further includes logic circuitry comprising interrupt request logic 502, logic gates 504 comprising in this embodiment 32 two-input AND gates, multiplexing circuitry 506, and priority logic 508 for generating interrupt address and control outputs.

The interrupt request logic 502 is coupled to an interrupt request bus 510, which may represent at least a portion of the system bus 206 of FIG. 2. The interrupt request logic 502 also receives as an input via line 512 an interrupt request thread identifier. The term "thread identifier" is also denoted herein as Thread_ID. The thread identifier for a given one of the threads may be stored in the above-noted thread identifier register for that thread. In the present example, where N=8 as previously noted, the thread identifier may be a three-bit identifier.

Generally, the inputs 510 and 512 are used to determine which bits in the TIFR should be set. More specifically, the interrupt request thread identifier supplied via input 512 is used by the interrupt controller 105 to select the portion of the flag register for the requested destination thread, and the interrupt request bus 510 provides information specifying the particular type of interrupt requested.

The term "thread identifier" as used herein is intended to include any information suitable for identifying a particular thread or a set of multiple threads in a multithreaded processor. By way of example and without limitation, the thread identifier may correspond to the output of a thread counter in a multithreaded processor. More particularly, a given multithreaded processor may be configured such that multiple threads are processed in a predetermined order, such as a round robin order, with the thread counter output being used to identify the particular thread being executed. In such an embodiment, there may be a total of eight threads that are processed in round robin order, with each thread being identified by a three-bit identifier, such that the output of a three-bit counter can be used to identify the particular thread being processed. Other embodiments may use a non-counter implementation of the thread identifier. A wide variety of different thread identifier configurations suitable for use with the present invention will be readily apparent to those skilled in the art.

The various threads of the multithreaded processor 102 can access the TIER and TIFR via the interrupt request logic 502. A given thread requesting a cross-thread interrupt of another thread supplies the interrupt request thread identifier of the thread to be interrupted to the interrupt request logic 502 via input 512. The thread to be interrupted by a cross-thread interrupt is also referred to herein as the "destination" thread.

Each of the two-input AND gates of the set of logic gates 504 receives as inputs a pair of bits, one from the TIER and one from the TIFR. For example, the left-most of the two-input AND gates receives as inputs the 32nd bits of the TIER and TIFR, that is, the bits identified as bit 31 in the DADR portions of the TIER and TIFR. The other bits of the TIER and TIFR are similarly applied in pairs to the two-input AND gates.

The outputs of the AND gates are applied to inputs of the multiplexing circuitry 506. More particularly, each of four eight-to-one multiplexers 506-1, 506-2, 506-3 and 506-4 receives as inputs the outputs of eight of the 32 two-input AND gates in the set of logic gates 504. The inputs received by the multiplexers 506-1, 506-2, 506-3 and 506-4 are associated with bits 0-7, bits 8-15, bits 16-23 and bits 24-31, respectively, of the TIER and TIFR.

Each of the multiplexers also receives as a select signal input the thread identifier of the next thread to execute, as supplied from the branch controller 210 to the interrupt controller 105 via connection 212 in the manner described in conjunction with FIG. 2 above. This thread identifier is supplied in conjunction with the above-noted query as to whether the next thread to execute has any pending interrupts. Based on the applied "next to execute" thread identifier, each of the multiplexers outputs a selected one of its eight inputs to the priority logic 508. The priority logic 508 utilizes these inputs to generate appropriate address and control outputs for the corresponding interrupts.

As will be described in further detail below, if there are pending interrupts for the "next to execute" thread, the interrupt controller 105 in response to the above-noted query first checks if the master interrupt enable bit is set for that particular destination thread. Then, if the master interrupt enable bit is set, the interrupt controller 105 delivers an appropriate control output and corresponding interrupt handler address to the branch controller via connection 214.

Figure 6:
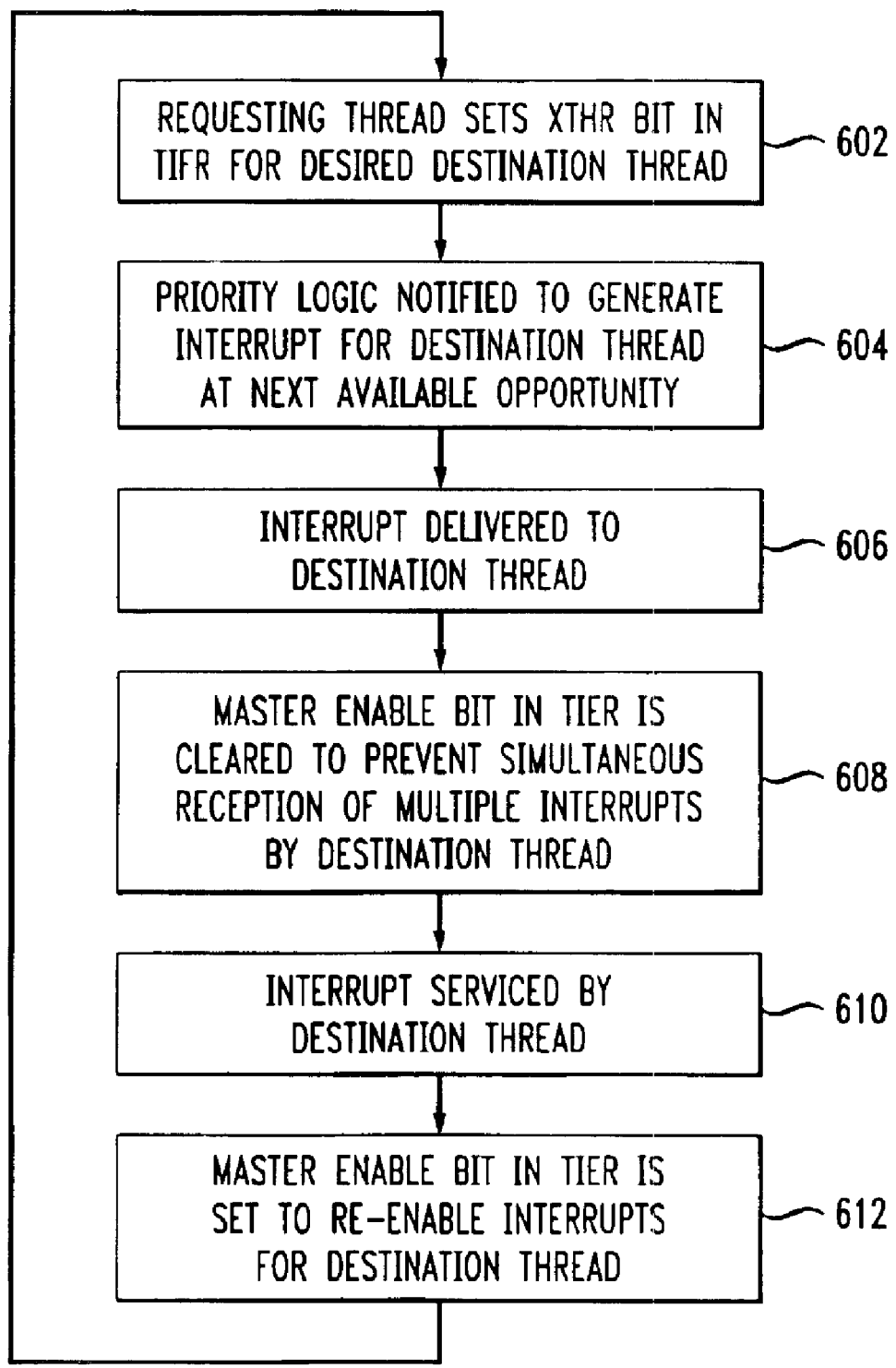
FIG. 6 is a flow diagram illustrating the processing of a cross-thread interrupt utilizing the techniques of the invention.

FIG. 6 is a flow diagram 600 illustrating example operations associated with the processing of a cross-thread interrupt in the interrupt controller 105. To deliver a cross-thread interrupt, the requesting thread sets the XTHR bit corresponding to the destination thread in the TIFR, as indicated in step 602. Based on the thread identifier of the "next to execute" thread, the multiplexers 506-1, 506-2, 506-3 and 506-4 pass the outputs of the corresponding two-input AND gates to the priority logic 508.

If the destination thread has its master enable bit set in the TIER, the output of the corresponding AND gate will be at a logic high level, and this arrangement in conjunction with the operation of the multiplexers provides a mechanism for notifying the priority logic 508 to generate a cross-thread interrupt for delivery to the destination thread at the next available opportunity, as indicated in step 604.

In the illustrative embodiment, this next available opportunity will generally arise the next time the destination thread is to execute an instruction. As indicated previously, the destination thread must also have its master enable bit set. In step 606, the interrupt is delivered to the destination thread, typically in the form of address and control information from the priority logic 508, as will be described in further detail below.

After the interrupt is delivered to the destination thread, its master enable bit is automatically cleared, as indicated in step 608. This prevents simultaneous reception of multiple interrupts by the destination thread, which the processor generally cannot handle correctly in this illustrative embodiment. The interrupt is then serviced by the destination thread, as indicated in step 610. After the interrupt is serviced, the master enable bit of the destination thread is automatically set in order to re-enable interrupts for the destination thread, as indicated in step 612. The process then returns to step 602 to process another cross-thread interrupt.

The automatic clearing and setting of the master enable bit in the FIG. 6 flow diagram should be considered exemplary rather than a requirement of the invention. In alternative embodiments, this function could be implemented using other techniques. For example, the master enable bit can be explicitly set or cleared by appropriate software instructions.

Although not shown in the figure, an operation for automatically clearing the XTHR interrupt pending bit in the TIFR may be included in the process after step 606, but this bit should not be re-enabled when the interrupt is serviced.

As indicated previously, the priority logic 508 generates address and control information based on the outputs of the multiplexing circuitry 506. In this embodiment, the priority of the cross-thread, timer, instruction address and data address interrupts is fixed in the order a, b, c and d, where a, b, c and d represent the respective outputs of the multiplexers 506-1, 506-2, 506-3 and 506-4. For a given set of the four inputs a, b, c and d, the priority logic 508 generates as outputs an interrupt address and a multi-bit control signal. The address output gives the execution address for the interrupt handler, which is the new execution address for the thread. The multi-bit control signal may be, for example, a five-bit signal in which the most significant bit indicates whether an interrupt has been taken, and the remaining bits indicate which interrupt is taken.

As a more particular example, the address and control signal may take on the following values, based on the inputs a, b, c and d, where the address is given in hexadecimal notation and the control signal in binary notation:

| | |
|---|---|
| Xthr_I0 = a; | XThr_address: 0x200 |
| | cntl: 10001 |
| Xthr_I1 = (not a and b); | Timer_address: 0x280 |
| | cntl: 10010 |
| Xthr_I2 = (not a and not b and c); | IADR_address: 0x300 |
| | cntl: 10100 |
| Xthr_I3 = (not a and not b and not c and d); | DADR_address: 0x380 |
| | cntl: 11000 |
| Otherwise | Address: don't care |
| | cntl: 00000 |

In the foregoing example, Xthr_I0, Xthr_I1, Xthr_I2 and Xthr_I3 denote different combinations of logic values for the priority logic inputs a, b, c and d, where presence of the value indicates that the value is at a logic high level and the term "not" before the value indicates that the value is at a logic low level.

It should be noted that the fixed priority arrangement described above is not a requirement of the invention. Other types of priority, such as random priority or programmable priority, can be provided in a straightforward manner.

As indicated above, the cross-thread interrupt techniques of the present invention provide significant advantages over conventional techniques. For example, the invention allows a given thread to interrupt another thread within a single instruction execution cycle. The invention thus provides a low-latency, low-overhead mechanism for delivering and servicing cross-thread interrupts in a multithreaded processor.

The above-described embodiments of the invention are intended to be illustrative only, and numerous alternative embodiments within the scope of the appended claims will be apparent to those skilled in the art. For example, the particular circuitry arrangements associated with the interrupt controller in the illustrative embodiments may be replaced with alternative arrangements of circuitry. Also, the number of threads, type and configuration of enable and flag registers, interrupt priority, thread identifier configuration and other parameters of the illustrative embodiments can be varied to accommodate the specific needs of a given application.

What is claimed is:

1. A method for processing a cross-thread interrupt directed from a requesting thread to a destination thread in a multithreaded processor, the method comprising the steps of:

receiving a request for delivery of the cross-thread interrupt to the destination thread;

determining whether the destination thread of the cross-thread interrupt is enabled for receipt of cross-thread interrupts; and utilizing a thread identifier to control delivery of the cross-thread interrupt to the destination thread if the destination thread is enabled for receipt of cross-thread interrupts;

wherein the requesting thread requests delivery of the cross-thread interrupt to the destination thread by setting a first bit in a single cross-thread interrupt resister, the cross-thread interrupt register being shared by a plurality of threads including at least the requesting thread and the destination thread, such that the destination thread is operative to request delivery of an additional cross-thread interrupt from the destination thread to the requesting thread by setting a second bit in the cross-thread interrupt register.

2. The method of claim 1, wherein the cross-thread interrupt register comprises a flag register of the multithreaded processor.

3. The method of claim 2 wherein an interrupt pending bit is automatically cleared when the cross-thread interrupt is delivered to the destination thread.

4. The method of claim 1 wherein the destination thread is enabled for receipt of cross-thread interrupts if a corresponding enable bit is set in an enable register of the multithreaded processor.

5. The method of claim 4 wherein the enable bit is automatically cleared when the cross-thread interrupt is delivered to the destination thread, in order to prevent simultaneous reception of multiple interrupts by the destination thread.

6. The method of claim 5 wherein the enable bit is automatically reset when the cross-thread interrupt is serviced by the destination thread.

7. The method of claim 1 wherein the request for the cross-thread interrupt is received and the cross-thread interrupt is subsequently delivered to the destination thread within a period of time having a duration of less than an instruction execution cycle of the multithreaded processor.

8. The method of claim 1 wherein the receiving, determining and utilizing steps are implemented in an interrupt controller.

9. The method of claim 8 wherein the interrupt controller comprises an enable register, the cross-thread interrupt register and logic circuitry.

10. The method of claim 9 wherein the enable register comprises at least N portions, each corresponding to one of N threads of the multithreaded processor.

11. The method of claim 10 wherein each of the threads is permitted to access only its corresponding portion of the enable register and none of the N-1 portions of the enable register corresponding to other threads.

12. The method of claim 9 wherein the cross-thread interrupt register comprises at least N portions, each corresponding to one of N threads of the multithreaded processor.

13. The method of claim 12 wherein each of the threads is permitted to access each of the N portions of the cross-thread interrupt register.

14. An apparatus for processing a cross-thread interrupt directed from a requesting thread to a destination thread in a multithreaded processor, the apparatus comprising:

an interrupt controller comprising logic circuitry, the interrupt controller being configured: (i) to receive a request for delivery of the cross-thread interrupt to the destination thread; (ii) to determine whether the destination thread of the cross-thread interrupt is enabled for receipt of cross-thread interrupts; and (iii) to utilize a thread identifier to control delivery of the cross-thread interrupt to the destination thread if the destination thread is enabled for receipt of cross-thread interrupts;

wherein the requesting thread requests delivery of the cross-thread interrupt to the destination thread by setting a first bit in a single cross-thread interrupt register, the cross-thread interrupt register being shared by a plurality of threads including at least the requesting thread and the destination thread, such that the destination thread is operative to request delivery of an additional cross-thread interrupt from the destination thread to the requesting thread by setting a second bit in the cross-thread interrupt register.

15. The apparatus of claim 14, wherein the interrupt controller further comprises an enable register, and the cross-thread interrupt register comprises a flag register, wherein the requesting thread requests delivery of the cross-thread interrupt to the destination thread by setting a corresponding interrupt pending bit in the flag register, and the destination thread is enabled for receipt of cross-thread interrupt if a corresponding enable bit is set in the enable register.

16. The apparatus of claim 15 wherein the logic circuitry comprises:

interrupt request logic for processing the interrupt request;

a plurality of logic gates, each receiving as inputs a corresponding bit from each of the enable register and the flag register; and multiplexing circuitry, the multiplexing circuitry selecting from among outputs of the logic gates at least one output for use in controlling generation of the cross-thread interrupt based at least in part on the thread identifier.

17. The apparatus of claim 16 wherein the logic circuitry further comprises priority logic for prioritizing the cross-thread interrupt relative to at least one additional type of interrupt including at least one of a timer interrupt, an instruction address interrupt and a data address interrupt.

18. The apparatus of claim 17 wherein the priority logic is configured to provide the cross-thread interrupt with a higher priority or a lower priority than the additional type of interrupt.

19. A multithreaded processor comprising:

a memory comprising at least one of a data memory and a cache memory; and an interrupt controller for processing a cross-thread interrupt directed from a requesting thread to a destination thread in the multithreaded processor, the interrupt controller being configured: (i) to receive a request for delivery of the cross-thread interrupt to the destination thread; (ii) to determine whether the destination thread of the cross-thread interrupt is enabled for receipt of cross-thread interrupts; and (iii) to utilize a thread identifier to control delivery of the cross-thread interrupt to the destination thread if the destination thread is enabled for receipt of cross-thread interrupts;

wherein the requesting thread requests delivery of the cross-thread interrupt to the destination thread by setting a first bit in a single cross-thread interrupt register, the cross-thread interrupt register being shared by a plurality of threads including at least the requesting thread and the destination thread, such that the destination thread is operative to request delivery of an additional cross-thread interrupt from the destination thread to the requesting thread by setting a second bit in the shared cross-thread interrupt register.

20. An article of manufacture comprising a machine-readable storage medium having embodied thereon program code for use in processing a cross-thread interrupt directed from a requesting thread to a destination thread in a multi-threaded processor, wherein the program code when executed by the processor implements the steps of:

receiving a request for delivery of the cross-thread interrupt to the destination thread;

determining whether the destination thread of the cross-thread interrupt is enabled for receipt of cross-thread interrupts; and utilizing a thread identifier to control delivery of the cross-thread interrupt to the destination thread if the destination thread is enabled for receipt of cross-thread interrupts;

wherein the requesting thread requests delivery of the cross-thread interrupt to the destination thread by setting a first bit in a single cross-thread interrupt register, the cross-thread interrupt register being shared by a plurality of threads including at least the requesting thread and the destination thread, such that the destination thread is operative to request delivery of an additional cross-thread interrupt from the destination thread to the requesting thread by setting a second bit in the cross-thread interrupt register.

* * * * *